Feb. 19, 1963  D. W. OSMUN  3,077,701
APPARATUS FOR APPLYING CHEMICALS
Filed Nov. 14, 1960  3 Sheets-Sheet 1
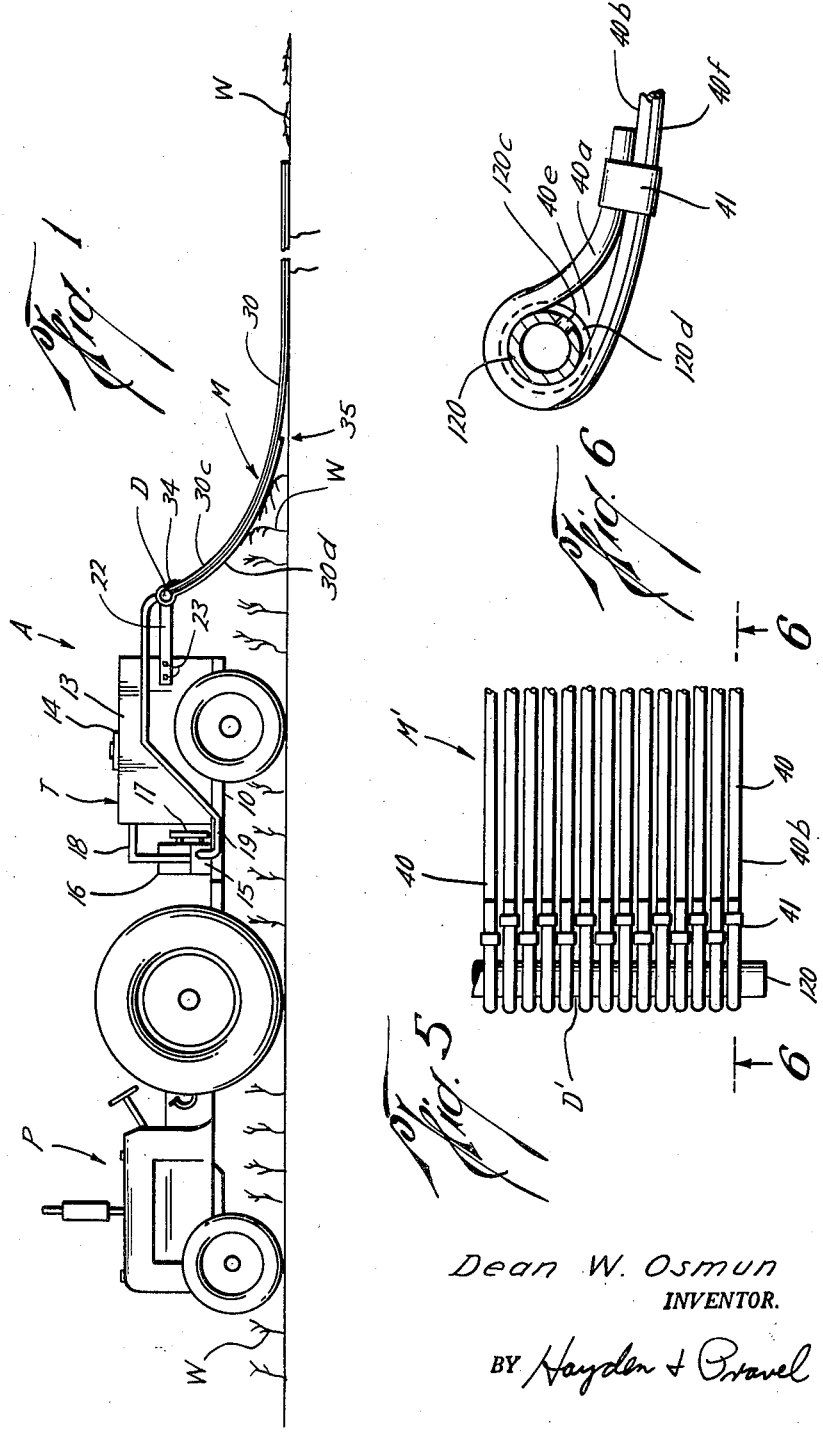
Dean W. Osmun
INVENTOR.
BY Hayden & Gravel
ATTORNEYS

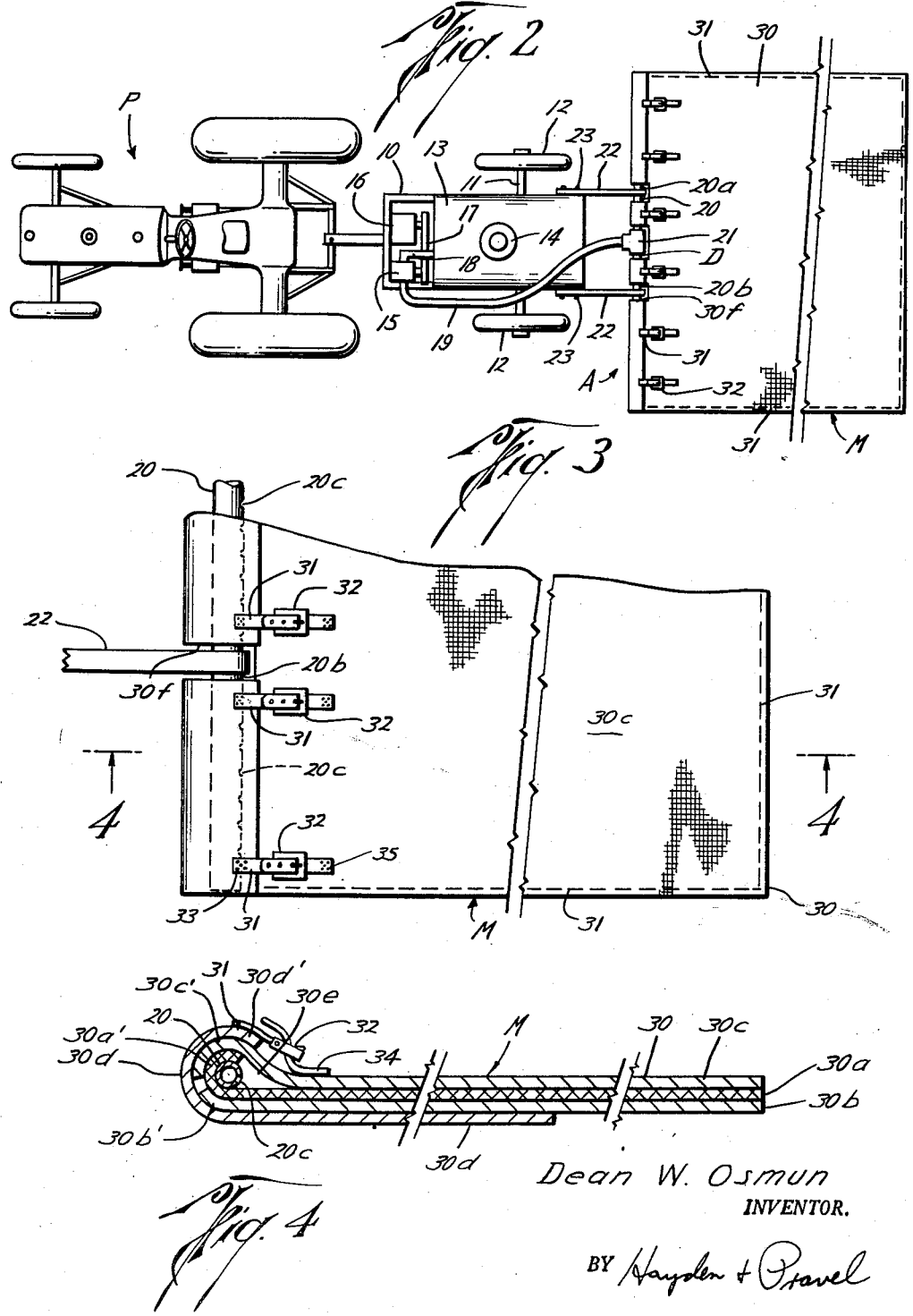

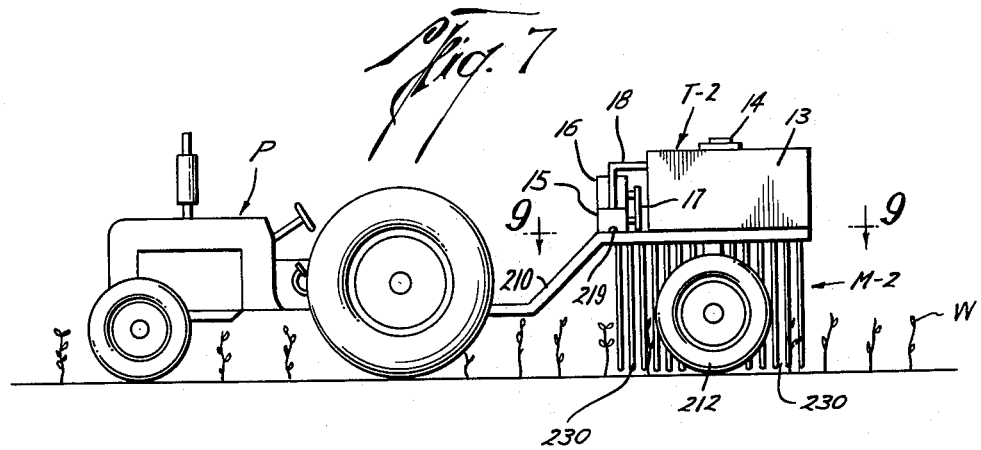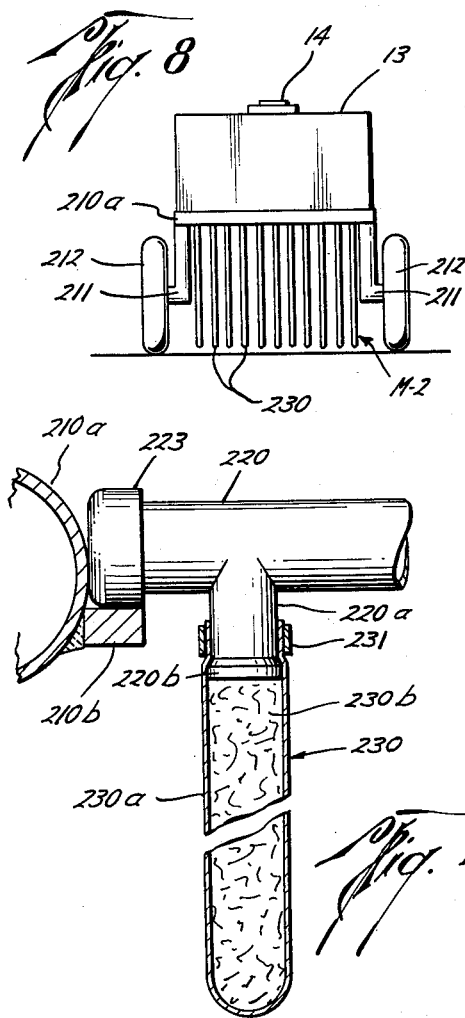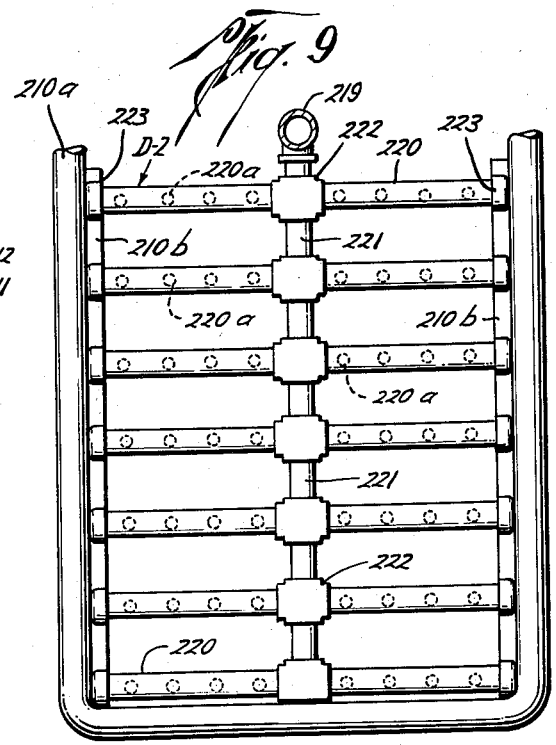
Dean W. Osmun
INVENTOR.
BY Hayden & Pravel
ATTORNEYS United States Patent Office 3,077,701
Patented Feb. 19, 1963

3,077,701
APPARATUS FOR APPLYING CHEMICALS
Dean W. Osmun, P.O. Box 4587, Houston, Tex.
Filed Nov. 14, 1960, Ser. No. 71,863
2 Claims. (Cl. 47—1.5)

The present invention relates to a new and improved apparatus for applying chemicals and more particularly to an apparatus which applies a chemical by directly contacting the weeds or other plants which are to be treated with the chemical.

This application is a continuation-in-part of my copending United States patent application, Serial No. 59,002, filed September 28, 1960, now abandoned.

Various types of apparatus are presently being used for applying weed killing chemicals, insecticides, fertilizers and other chemicals to plants, the majority of which utilize spraying nozzles of one kind or another for spreading the chemical over the area to be covered. Such spreading or spraying is conducted from airplanes, tractors or the like or even by hand in some instances. Regardless of the care exercised by the person or persons conducting the spraying operations a certain amount of drifting of the chemicals takes place. When a weed killing chemical is being distributed, areas adjoining or near the area in which weeds are to be destroyed frequently are subjected to the weed killing chemical as a result of drift or careless application of the weed killer. This can be exceedingly harmful when such adjoining or nearby areas contain cotton or other desirable crops which are affected by the weed killing chemical being sprayed. When insecticides and other chemicals are distributed by spraying, there is a considerable loss of the chemical itself due to winds and also there is a relatively low efficiency since much of the chemical is deposited in areas which are not intended for treatment.

The apparatus of the present invention overcomes the above problems as well as others by providing new and novel apparatus in which a chemical is applied by substantially direct contact of a portion of the apparatus with the weeds to be killed or destroyed, or with the plants to be treated with insecticide or other chemical.

It is therefore an object of this invention to provide new and improved apparatus for applying chemicals directly to plants rather than by spraying or other means heretofore used to thereby reduce the loss of the chemical due to winds and also to more effectively apply the chemical to the plants intended to be treated with the chemical.

It is also an important object of the present invention to provide new and improved weed killing apparatus which inhibits drifting of the weed killing chemical used therewith thereby protecting nearby crops during weed killing operations.

Another object of the present invention is to provide new and improved chemical distributing apparatus having an absorbent means which is used to apply a chemical by contact with the plants being treated.

A further object of this invention is to provide new and improved apparatus for applying or distributing an insecticide or other chemical to plants, such as cotton, in the field so as to reduce the loss of the insecticide or chemical due to the blowing of same by winds and to also increase the efficiency or effectiveness of the application by depositing the chemical on only the plants to be treated rather than on the surrounding ground and other plants which are not to be treated.

Other objects and advantages of the present invention will become more readily apparent from a consideration of the following description and drawings wherein:

FIG. 1 is a side elevation illustrating the apparatus of the present invention when in operation;

FIG. 2 is a plan view illustrating the apparatus of the present invention;

FIG. 3 is an enlarged partial plan view of the applicating device of the present invention;

FIG. 4 is a view taken along line 4—4 of FIG. 3;

FIG. 5 is an enlarged partial plan view of an alternate form of the applicating device of the present invention;

FIG. 6 is a view taken along line 6—6 of FIG. 5;

FIG. 7 is an elevation illustrating a modified apparatus of this invention which is particularly suitable for applying an insecticide to plants;

FIG. 8 is an end view of the form of the apparatus illustrated in FIG. 7;

FIG. 9 is a plan view taken on line 9—9 of FIG. 7 and illustrating in particular the preferred liquid distribution header; and FIG. 10 is a view, partly in elevation and partly in section, illustrating in detail one of the applicator members of the apparatus of FIG. 7.

Referring to the drawings, the letter A designates generally one form of the apparatus of the present invention which is used to apply a weed killing solution, insecticide or other chemical to an area. The apparatus A includes principally a trailer T, its component parts, a distributing means D and an applicator means M attached thereto. The apparatus A may be propelled or moved by any suitable vehicle or other propelling device, such as the tractor P, as seen in FIG. 2, truck, car, or even by hand if so desired. With the apparatus A of this invention, the applicator means M actually contacts the plants W to be treated so as to physically wipe or spread the chemical on such plants W, and therefore, substantially all of the chemical is applied to the plants or objects being treated.

Referring now to the first form of the invention illustrated in FIGS. 1-4, the trailer T is seen to include a frame 10, to which is secured in the usual manner an axle 11 with a pair of wheels 12 thereon. A storage tank or container 13, adapted to hold or store a weed killing chemical or solution, is positioned on the frame 10 and secured thereto by welding or other suitable means. The tank 13 has an opening in the top thereof to enable the weed killing liquid, insecticide or other chemical to be placed therein and a suitable cover 14 is provided for closing the opening to prevent evaporation and to substantially seal the container. A pump 15 is mounted on the frame 10 and is operated by any suitable motor or engine 16 which is also mounted on the frame 10. The engine 16 and the pump 15 are operably connected by means of a V-belt 17 or other suitable drive mechanism. A fluid transmitting means such as pipe 18 or the like connects the container 13 with the pump 15, so that the chemical in the container 13 may be moved or transmitted from the container 13 through the pump 15 and into a flexible hose or line 19 or other desirable means connected to the distributing means D.

The distributing means D in its preferred form, includes a tubular member or pipe 20 which may be divided into two portions 20a and 20b connected together in the middle or center thereof by a T pipe section 21. The T pipe section 21 is also connected to the hose 19 so that the chemical may be pumped into the distributing means D from the hose 19. A pair of brackets 22 is connected to the rear of the container 13 and attached laterally on each side thereof by any suitable means such as the bolts 23. Each of the brackets 22 has an opening in the end thereof for receiving the pipe 20 therein, with the pipe portion 20a being positioned in one bracket 22 and the pipe portion 20b being positioned in the other bracket 22. A plurality of openings or holes 20c are longitudinally spaced in the pipe 20 at appropriate intervals permitting the chemical to flow therethrough to the applicator means M. Such openings or holes 20c can best be seen in FIGS. 3 and 4. Additional bracing or brackets may be supplied as desired.

The applicator means M, which can be seen in detail in FIGS. 3 and 4, includes a mat unit 30 preferably formed by a plurality of mats or layers 30a, 30b, 30c and possibly others which are secured together by stitching 31 or any other suitable means. The inner or center mat or layer 30a is preferably formed of burlap, cotton wadding or other suitable porous and preferably absorbent material. A heavier and relatively stronger lower mat or layer 30b is secured to the underside of the mat or layer 30a and is preferably made from duck, canvas or other suitable tough material which is also porous or otherwise capable of transmitting fluid therethrough from the mat 30a to the weeds or plants W. The layer or mat 30b also serves to protect the adsorbent mat 30a from damage due to rough ground or other objects thereon during the movement of the applicator M in use to thereby increase the overall life or usefulness of the applicator means M. An upper mat 30c is secured to the upper side of the center mat 30a and is preferably made from a relatively high strength material such as duck, canvas or leather. The upper mat 30c is also preferably waterproof to inhibit evaporation of the liquid chemical from the absorbent mat 30a.

A partial mat 30d is sewn or otherwise secured to the underside of the upper end of the mat 30b, and as more clearly seen in FIG. 1, preferably extends from the distribution means D to the approximate point or area of ground contact 35 and is also preferably made of a relatively high strength, tough, waterproof material, for example, leather or other material such as duck or canvas which has been treated with a waterproofing substance. The partial mat 30d prevents or limits premature dripping or distribution of the chemical upon the weeds or plants W below the curved portion of the mat unit 30 (FIG. 1) so that the liquid weed killer or other chemical is distributed to the substantially horizontal or flat portion of the mat unit 30 (FIG. 1) which is in contact with the weeds or plants W. Also, by preventing or limiting the dripping of the chemical to the area below the curved portion of the mat unit 30 where it might be subject to being blown by wind, the possibility of the drifting or blowing of the chemical away from the area being treated is thereby reduced.

The forward end portion 30a' is of sufficient length to enable it to be curved or placed around the pipe 20 (see FIG. 4), and such upper portion 30a' is not secured or attached to the upper portion 30c' of the layer 30c. The end portion 30c' is adapted to be placed over the end portion 30a' on the pipe 20 and forms the space 30e. The partial mat 30d is secured to the upper portion 30b' of the mat 30b, but is not secured to the upper end portion 30c' of the mat 30c. This enables the unit M to be quickly and easily placed around the pipe 20. A plurality of straps 31, each having a buckle 32 secured thereto, are appropriately spaced and attached to the upper portion 30d' of the mat portion 30d by stitching 33 or other suitable means. A plurality of straps 34, adapted to be attached to the buckles 32, are fastened or otherwise stitched or connected at 35 to the upper end portion 30c' of the mat 30. Although the applicator M is illustrated as being fastened to the distributing means D by the straps 31 and 34 and the buckles 32, any other suitable fastening device or means may be used without departing from the scope of the invention.

Suitable slots or openings 30f are provided in the mats 30 whereby the apparatus M may be positioned around the brackets 22 on the container 13. The openings 20c along the pipe 20 are preferably in alignment with each other and are spaced so as to permit the fluid to pass or flow therethrough into the space 30e. This arrangement permits efficient distribution of the chemical or liquid through the openings 20c onto the absorbent mat 30a.

It should also be noted that the length and width of the apparatus M may be varied as desired. It can be appreciated that additional layers of material, either absorbent or otherwise, may be used without departing from the scope of the invention. It should also be noted that the mat 30a could be used without the necessity of the mat 30c or 30b or the mat portion 30d. Additional mats, 30b, or 30c may be used with the mat 30a as necessary or desired. The mat 30b is primarily for protecting or prohibiting from damage the more delicate mat 30a. The mat 30c is primarily for the purpose of adding strength to the overall apparatus M and for prohibiting or inhibiting evaporation of the chemical or liquid from the mat 30a.

The form of the device of the present invention shown in FIGS. 1–4 is preferably used for applying a weed killing solution or liquid to weeds W, but it may be used for applying other chemicals to plants other than weeds providing the plants are not damaged by the mat unit 30 contacting them. The tank 13 is filled with the appropriate weed killing solution or other chemical and the apparatus M is positioned on the trailer T as illustrated in FIGS. 1 and 2. The engine 15 is started to operate the pump 16 for forcing the weed killing solution or other chemical from the container 13 through the pump 16, into the line 19, and into the pipe 20. From the pipe 20, the liquid is emitted through the openings or holes 20c onto the absorbent layer or mat 30a. The weed killing solution or other chemical is then wiped or directly applied to the weeds or other plants W by moving the unit 30 over the weeds or plants W by pulling the unit 30 with the tractor P, as illustrated in FIG. 1, wherein the weeds or plants W are shown both before and after they have been wiped with the mat or unit 30. The applicator means M enables the weed killing solution or other chemical to be applied substantially directly on the weeds or plants W, thereby substantially eliminating the problem of drifting of the poison or other chemical, and thus only the area which is intended to be covered with poison or other chemical, actually receives the poison or other chemical.

Referring now to FIGS. 5 and 6, an alternate form of the invention is illustrated. The distributing means D' is substantially the same as the distributing means D of the form of the invention shown in FIGS. 1–4. The apparatus M' designates the applicator means of the invention in a simplified form, and includes a plurality of absorbent means or members 40 such as wicks, lines, ropes or the like which are made from cotton or other absorbent material. Openings 120c are spaced along the pipe 120 so as to be in alignment with each of the wicks 40 (see FIG. 6) thereby permitting fluid from the distributing means D' to be emitted on each of the wicks 40. The wicks 40 may be arranged on the pipe 120 as closely as desired or as is necessary to adequately cover the area in which weeds or plants W are to be contacted by the chemical. The space 40e is formed by looping one end 40a of each wick 40 over the pipe 120 and securing such end 40a to the main portion of the wick 40 by means of a clamp 41, a knot, or any other suitable means. An annular groove 120d for each means 40 may be provided in the outer surface of the pipe 120 for receiving the wicks 40 so that the wicks 40 may remain substantially in their relative positions.

In order that the chemical or solution may not drip from the forward downwardly curved portion 40b of the wick 40, a waterproof coating 40f of plastic, wax or any other suitable waterproofing substance, may be applied to the underside of the forward portion 40b of the wick 40. Such protective covering 40f performs a function similar to that performed by the partial mat 30d. Although the wick 40 is preferably coated on the underside of its forward portion 40b, i.e., the portion of the wick 40 extending from the distributing means D' to the point of ground contact, it may be used without such coating 40f.

The modification of FIGS. 5 and 6 is used in the same way as the apparatus of FIGS. 1–4, except that the weed killer or other chemical is distributed by the wicks 40 instead of the applicator means M.

Referring now to the form of the invention illustrated in FIGS. 7–10 of the drawings, it is to be noted that the parts which are the same in FIGS. 7–10 as in FIGS. 1–4 bear like numerals. Thus, the trailer T–2 corresponds with the trailer T of FIGS. 1–4 and it includes a tank 13 for insecticide or other chemical, which has a suitable cover 14 thereon. Also, the trailer T–2 includes a pump 15 which is mounted on a frame 210 and which is operated by any suitable motor or engine 16 which is likewise mounted on such frame 210. The engine 16 and the pump 15 are operatively connected by means of a V-belt 17 or other suitable drive mechanism. A fluid transmitting pipe 18 connects the container 13 with the pump 15 so that the chemical in the container 13 may be pumped or transmitted from the container 13 through the pump 15 and into a pipe 219 (FIG. 9) which connects with the distributing means D–2 (FIG. 9).

The trailer T–2 is supported on wheels 212 which are mounted on stub axles 211 or any other suitable support of conventional construction connected to the substantially U-shaped upper frame portion 210a of the frame 210. The trailer T–2 is pulled by the tractor P or any other suitable pulling means, or even by hand if so desired.

In the preferred form, the distributing means D–2 includes a plurality of laterally extending pipes or tubes 220 which are interconnected and are joined with a plurality of longitudinally extending pipes or tubes 221 by means of connectors or couplings 222. The outer ends of each of the laterally extending pipes or tubes 220 has a cap or closure plug 223 threaded or otherwise connected thereon to prevent flow through the outer ends of the laterally extending pipes or tubes 220. The distributing means D–2 is supported on the frame portion 210a in any suitable manner such as by welding or the like, but as illustrated in FIG. 9, the frame portion 210a includes support strips 210b which are welded or are otherwise secured to the frame portion 210a to receive the outer ends of the laterally extending pipes or tubes 220. Each of the pipes or tubes 220 has a plurality of downwardly extending tubular fittings 220a, each of which is adapted to receive an applicator means 230. Therefore, a plurality of such applicator means or assemblies 230 hang or extend downwardly from the frame portion 210a as best seen in FIGS. 7 and 8 and together they form the applicator means M–2.

Each of the applicator assemblies 230 is in effect a tubular mat unit or an absorbent sack. Each applicator assembly 230 is preferably formed with a flexible tube or sack 230a which is made of a material such as canvas through which the liquid insecticide or other chemical may pass slowly and uniformly for wiping the plants W as illustrated in FIGS. 7 and 8 in particular. By way of further example, the tubular sacks 230a may also be formed of burlap, various types of cloth, and woven fibrous material. Each of the sacks or tubes 230a has therein a plurality of absorbent layers 230b which may be in the form of strings or wadding so as to receive the chemical and retain same for flow or distribution outwardly through the material forming the sack or tube 230a. Such layers or wadding 230b may be formed of porous absorbent material such as cotton, hemp, twisted strings of cotton or linen, and any other material capable of retaining the liquid and distributing same through the sack 230a. The upper end of each sack 230a is connected to the downwardly extending tube 220a by any suitable retaining clamp or band 231 which is preferably of a known releasable type to facilitate the removal and replacement of each of the assemblies 230. An enlarged lower annular flange or lip 220b is preferably provided on each downwardly extending tube 220a to facilitate the holding of the upper end of each of the assemblies 230a.

It is to be noted that the frame portion 210a is elevated with respect to the ground and as compared with the frame 10 illustrated in FIGS. 1 and 2 of the drawings. Such elevation permits the assemblies 230 to be relatively long so that they can adequately contact the plants W without knocking them over or otherwise damaging them. The wheels 212 are spaced apart a sufficient distance to ride in the furrows or areas between the plants W.

In the use or operation of the apparatus illustrated in FIGS. 7–10, the chemical, preferably an insecticide, is pumped with the pump 15 to the distributing means D–2 as the trailer T–2 is pulled through the field with the tractor P or similar power source. The chemical is pumped to the distributing means D–2 through the pipe 219 and is thereby distributed under pressure to each of the laterally extending pipes 220. The chemical liquid thus under pressure is fed to the applicator assemblies 230 for a uniform but relatively slow flow of the chemical outwardly through the sack 230a of each of the assemblies 230. The liquid chemical which is thus on the outside of each of such sacks 230a is wiped on or is spread on the plants W as the trailer T–2 passes through the field where such plants W are located. In that way, the chemical is applied to the plants W directly by the physical contact of the tubes or sacks 230a so that there is no blowing or drifting of the chemical during its distribution or application. Since the assemblies 230 are flexible and are mounted from the distributing means D–2 for a free swinging movement, they can contact or wipe the plants W without knocking such plants over or otherwise damaging them. Even if the plants W are temporarily displaced, the force applied to them from the freely swinging assemblies 230 does not cause any permanent displacement or damage.

Although the device of the present invention has been illustrated and described in FIGS. 1–6 as having a motor 16 and a pump 15, such motor 16 and pump 15 could be eliminated and the tank or container 13 positioned above the distributing means D. The chemical would then be gravity fed from the container 13 to the distributing means D or D' as the case may be. Also, in the form of the apparatus shown in FIGS. 7–10, the feed of the liquid insecticide or other chemical may be by gravity, but a pump feed is much better because the distribution of the chemical is more uniform.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for applying a liquid to plants, comprising a frame, a container on said frame for storing the liquid, distributing means on said frame for receiving the liquid from said container, means on said frame for transferring the liquid from said container to said distributing means, and absorbent applicator means connected to said distributing means for receiving the liquid from said distributing means, said absorbent applicator means including a flexible absorbent material, and a partial mat of a waterproof material on the underside of the flexible absorbent material extending from the upper end of said flexible absorbent material for only a portion of the length of said flexible absorbent material, whereby a portion of the flexible absorbent material is unsupported and is adapted to directly contact the plants.

2. An apparatus for applying a liquid to plants, comprising a frame, a container on said frame for storing the liquid, distributing means on said frame for receiving the liquid from said container, means on said frame for transferring the liquid from said container to said distributing means, and absorbent applicator means connected to said distributing means for receiving the liquid from said distributing means, said absorbent applicator means including a flexible absorbent material having a curved portion extending downwardly from said distributing means and a substantially flat portion adapted to be moved in physical contact with the plants, and a partial mat of flexible waterproof material secured to the underside of substantially only said curved portion to thereby avoid any appreciable loss of the liquid through said curved portion while the flat portion of flexible absorbent material is moved directly in contact with the plants.

References Cited in the file of this patent

UNITED STATES PATENTS

| | | |
|---|---|---|
| 1,527,669 | Camp | Feb. 24, 1925 |
| 1,764,952 | Hay | June 17, 1930 |
| 2,223,809 | Rucker | Dec. 3, 1940 |
| 3,009,290 | Bratton | Nov. 21, 1961 |

FOREIGN PATENTS

| | | |
|---|---|---|
| 11,263 | Great Britain | of 1893 |